United States Patent [19]

Rossig et al.

[11] Patent Number: 4,898,511
[45] Date of Patent: Feb. 6, 1990

[54] APPARATUS FOR STACKING PRODUCTS THAT ARE HIGHLY SUSCEPTIBLE TO DAMAGE, PARTICULARLY BOOKS

[75] Inventors: Manfred Rossig, Beckum; Rolf Budde, Lohne, both of Fed. Rep. of Germany

[73] Assignee: Kolbus GmbH & Co. KG, Rahden, Fed. Rep. of Germany

[21] Appl. No.: 141,310
[22] PCT Filed: Apr. 23, 1987
[86] PCT No.: PCT/DE87/00180
  § 371 Date: Dec. 7, 1987
  § 102(e) Date: Dec. 7, 1987
[87] PCT Pub. No.: WO87/06565
  PCT Pub. Date: Nov. 5, 1987

[30] Foreign Application Priority Data
  Apr. 26, 1986 [DE] Fed. Rep. of Germany ....... 3614256

[51] Int. Cl.⁴ .............................................. B65G 57/11
[52] U.S. Cl. ............................. 414/792.6; 414/793.8; 414/794.3; 414/794.5; 414/903
[58] Field of Search .................... 198/817; 414/57, 68, 414/82, 84, 85, 903, 791.6, 792.6, 793.4, 793.8, 794.3, 794.5, 794.6, 794.7

[56] References Cited

U.S. PATENT DOCUMENTS 2,675,928  4/1954  Slater ................................ 414/82 X
3,028,979  4/1962  Zachow ............................. 414/82
3,159,430 12/1964  Kinney ............................... 198/817
3,756,427  9/1973  Arnemann ......................... 414/82
4,367,999  1/1983  Benuzzi ............................. 414/85 X
4,614,473  9/1986  Kwauka et al. ................... 414/68
4,711,612 12/1987  Kwauka ............................. 414/68

FOREIGN PATENT DOCUMENTS 1081373  5/1960  Fed. Rep. of Germany .
3139828  4/1983  Fed. Rep. of Germany .
1531662  7/1968  France .
2178430 11/1973  France .
52-49575  4/1977  Japan ................................ 414/903

Primary Examiner—David A. Bucci
Assistant Examiner—Janice Krizek
Attorney, Agent, or Firm—Chilton, Alix & Van Kirk

[57] ABSTRACT

A stacking of fragile articles, particularly printed matter, is achieved in a substantially frictionless manner in order to eliminate damage. The stacking apparatus includes a feed system wherein incoming books are at least in part supported on an air cushion as they are formed into rows which are subsequently transferred onto a sliding platform which also, at least in part, establishes an air cushion beneath the articles. Movements are imparted to the sliding platform such that it may be retracted from under the feed system once a formed row of articles has been transferred thereto to gently deposit the row on a pallet or preformed stack supported on a pallet.

17 Claims, 1 Drawing Sheet

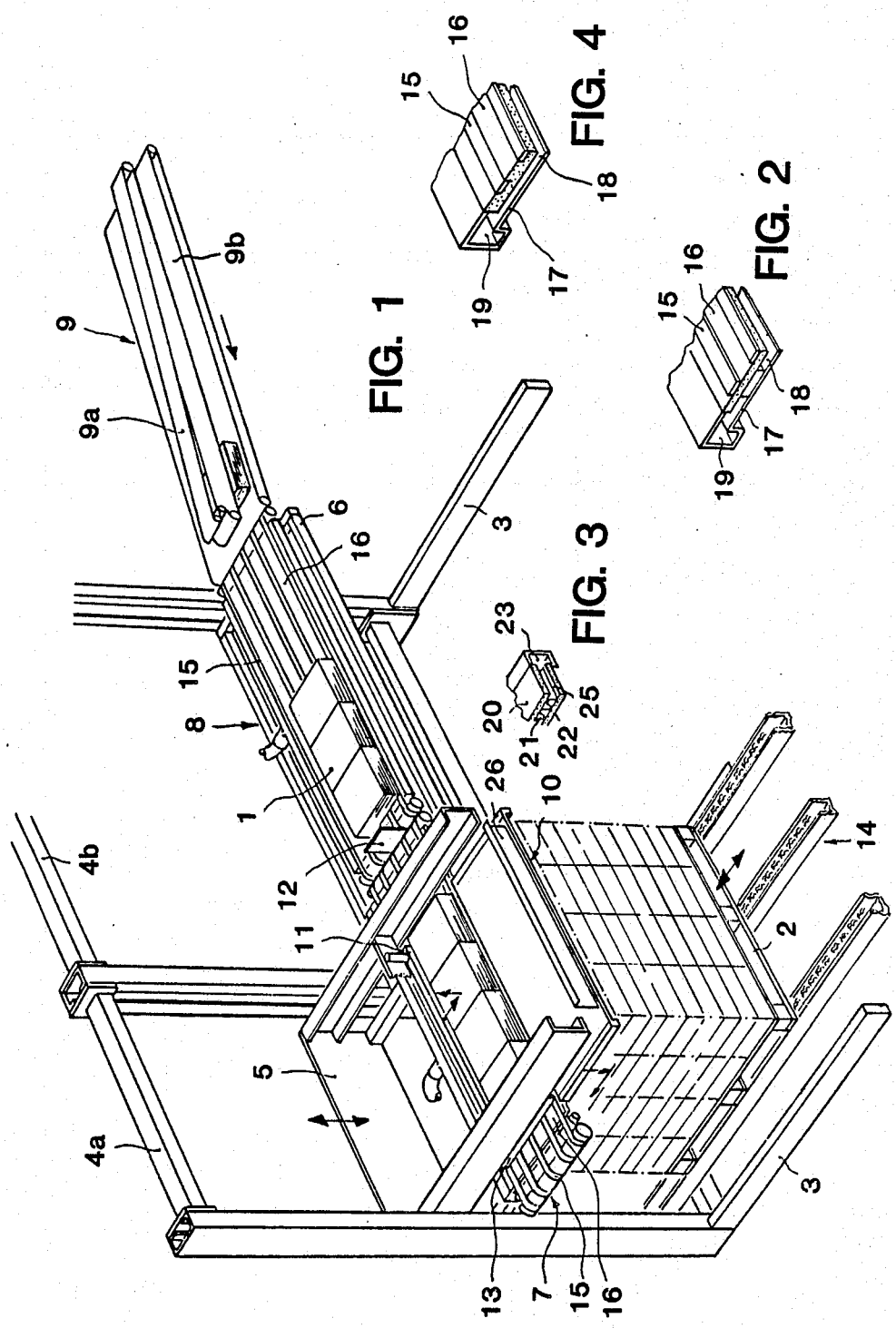

APPARATUS FOR STACKING PRODUCTS THAT ARE HIGHLY SUSCEPTIBLE TO DAMAGE, PARTICULARLY BOOKS

The invention relates to novel apparatus for stacking products that are highly susceptible to damage, particularly books, brochures or similar products. This apparatus of the present invention possesses a feed system which is designed to receive products that are to be packaged and to form them into a row. This apparatus further possesses a sliding platform which is located beside the feed system, onto which the row of products that are to be packaged is pushed by means of a push-off element, and which is movable to beneath the feed system, and at the same time the row of products that are to be packaged, or, if appropriate, rows of such products that have been assembled to form a layer on the sliding platform, is or are, as the case may be, swept off against the stationary push-off element, onto a preexisting layer of the products that are to be packaged.

The present invention is related to the apparatus that was disclosed in published Federal Republic of Germany Application DE-OS 31 39 828.

As a result of friction between the products and the surfaces on which they are supported immediately prior to transfer onto a feed system, the friction occurring during the pushing of the products sideways off the supporting surfaces onto a sliding platform, and also the friction which occurs while pushing them off the latter, conventional palletizing installations are incapable of meeting the requirement according to which products that are highly susceptible to damage should be treated gently, stacked books or brochures being examples of such products.

Furthermore, during the loading of products onto pallets in accordance with a defined stacking order, the concurrent frictional forces make it impossible to maintain a collective arrangement that is predetermined during the row-forming operation and to effect alignment during the operation in which the products are pushed off the feed system, or off the sliding platform. In many cases, it is impossible to perform an alignment operation once the products have been stacked, due to the fact that when this is attempted, certain products, such as stacked books or brochures, are telescoped into one another, which creates problems when they are subsequently destacked.

If, however, the products will tolerate a final alignment operation, this will demand additional engineering expenditure of a not inconsiderable magnitude.

The object of the invention is to provide an apparatus for stacking products, particularly books, brochures or similar articles, namely an apparatus which is of the abovementioned generic type, which guarantees that the products are treated gently while at the same time exhibiting high levels of functional reliability and economic efficiency, and which, furthermore, ensures precise preservation of the predetermined alignment and collective arrangement of the products that are assembled to form a row.

The above-stated objectives are achieved by means of a design wherein the supporting surfaces of a feed system and a sliding platform are composed of a highly porous sintered—or similar—material which is permeable to fluid media, and to which a gaseous medium can be supplied in order to produce an air cushion, the permeability of the sintered material being chosen to be such that the pressure drop in an unladen portion is at least equal to or higher than the pressure drop in a portion that is laden with the products, and wherein transport means are provided for moving the products forward, across the supporting surfaces of the feed system.

The apparatus according to the invention enables highly damage-susceptible products to be handled, during transportation, in a manner that is absolutely safe, as well as being gentle, while at the same time the loss of gaseous supporting medium is minimized. As a result of the reduction or, in some cases, the avoidance of friction between the products that are moved relative to the supporting surfaces, the predetermined alignment and collective arrangement can be maintained in a precise manner, as was only very rarely feasible in conventional palletizing installations, especially those involving the withdrawal of a sliding platform from beneath the row of product articles.

An illustrative embodiment of the invention is explained in greater detail in the paragraphs which follow, this explanation being referred to the drawings, in which FIG. 1 is a schematic isometric view of a first embodiment of apparatus for stacking books, brochures or similar products in accordance with the invention, FIGS. 2 and 3 show, likewise isometrically, the construction of the feed system and sliding platform of the FIG. 1 apparatus, in section and on an enlarged scale, and FIG. 4 is a view similar to FIG. 2 showing an alternate belt construction.

The apparatus for stacking books 1 onto a pallet 2 has a baseframe 3 with a first portal 4a for mounting a vertically movable support frame 5. A second portal 4b directly adjoins the portal 4a. A vertically movable support frame 6 is positioned within portal 4a and is coupled to the frame 5. Frame 6 is raised or lowered together with frame 5 through distances such that these two support frames 5, 6 match the stack height.

The support frames 5, 6 serve to receive two feedways 7, 8 which are arranged in series and disposed at the same level. Books 1 are fed via feedways 7, 8 from their point of arrival on an angularly adjustable conveyor 9. Conveyor 9 has upper and lower belts 9a, 9b. A row of books, the first to be stacked, forms as a result of a series of arriving books coming up against a stop 13, while the books that arrive afterwards run against a stopper 12 and are accumulated.

A sliding platform 10 is located in the support frame 5, for movement transversely with respect to the path of movement of objects on the feedway 7, and is mounted in a manner such that it can be moved vertically through a defined distance. A push-off element 11 is also located in the frame 5, as is an oppositely disposed aligning rail 26. The row of books which has accumulated at the stop 13 is pushed sideways from the feedway 7 by the push-off element 11, in the conventional manner, onto the adjacent sliding platform 10 that is standing ready, and finally comes up against the aligning rail 26. Immediately afterwards, the stopper 12 is lowered and the feedway 7 is unblocked, whereupon the books 1 that arrived afterwards run up against the stop 13 in order to form a new row.

The sliding platform 10 is now lowered to a level just above the row of books that have already been stacked to form a layer, and is also retracted to beneath the feedway 7, this movement causing the row of books to come up against the stationary push-off element 11, to be pushed off the sliding platform 10 and, once the aligning rail 26 has first been raised, to be deposited onto the layer of books that have already been stacked. An additional vertical movement is necessary in order to move the push-off element 11 back, over a row of books which have run in. Once the operation of pushing-off the row of books has been completed, the sliding platform 10 returns to its starting position.

In order to deposit the books 1, in successive rows, onto the pallet 2, or onto a layer of books that has already been formed, as the case may be, the pallet is moved backwards and forwards by means of a bottom conveyor 14, in the arrow directions, each of these movements corresponding to the width of the row of books.

As FIG. 2 clearly shows, the two feedways 7, 8 are formed by supporting surfaces 16 and forward-motion belts 15, the latter being spaced one from another and being driven in a manner such that they revolve while being supported on the surfaces 16. In order to reduce the friction between the books 1 and the supporting surfaces 16, the latter are composed of a highly porous sintered material which is permeable to fluid media, and to which air is supplied in order to product an air cushion.

The supporting surfaces 16 are spaced from a structural component 17 which serves as a support element and with which they cooperate to form an airspace 18 that is contiguous with a connection duct 19 via which air is introduced as the supporting medium.

The supporting surface 20 of the sliding platform 10 is composed of the same sintered material, in exactly the same way as the supporting surfaces 16 of the two feedways 7, 8, so as to enable frictional forces to be eliminated during the pushing-on and retraction operations.

As FIG. 3 shows, the supporting surface 20 is located on an intermediate support 21, beneath which a further supporting surface 22 is arranged, this surface 22 likewise being composed of a sintered material. The two supporting surfaces 20, 22 form the boundary of an airspace 25, to which pressurized air can be admitted via connection ducts 23 that are located on two edges of the sliding platform 10.

The air-connection ducts for the feedways 7, 8 and for the sliding platform 10 are supplied from sources of air which are not shown in the drawings, utilizing connections and pipe systems.

The sliding platform 10 can support itself on a layer of books that have already been deposited, support being via the downward-acting air cushion that is formed by the supporting surface 22, so that, as a result of this air-cushion support, stacking can be performed with the smallest possible level difference, with no risk of inadvertently displacing the products beneath.

The sintered material utilized as the supporting surface, both for the feedways 7, 8 and for the sliding platform, has a permeability such that the pressure drop in the unladen portions is at least equal to or higher than the pressure drop in the portions that are laden with the products. As a result, the air flow rate needed to support the products is not exceeded, while on the other hand avoiding air-cushion collapse at other locations, or collapse in the event of uneven loading.

The invention is not restricted to the illustrative embodiment shown in the drawing and explained above, and is amenable to numerous modifications.

For example, as shown in FIG. 4, with a view to improving their guidance, the belts 15 can be inset into grooves in the supporting surfaces 16 of the feedways 7, 8. Furthermore, as shown in FIG. 4, use can be made of a transport belt 15' which is composed of an air-permeable material, and which extends over the entire width. For the forward motion, it is also possible to employ transport belts which act on the books from above, instead of the transport means employed in the chosen illustrative embodiment.

Lastly, the sintered material can also be utilized for producing a partial vacuum in the supporting surfaces of the feed system 7, 8 and sliding platform 10, in order, for example, to check the motion of the books, or for positive positioning. It will also be necessary to connect the supporting surfaces to a source of suction, and the permeability of the sintered material must be chosen to be such that the resistance in the uncovered portion is not less than the resistance in the portion that is covered by the products.

What is claimed is:

1. Apparatus for stacking fragile products comprising:

feed system means, said feed system means comprising first support means for serially receiving the products to be stacked, said feed system means further comprising first stop means which cooperates with said first support means for arresting the movement of the products in a first direction, said first support means including transport means and a first supporting surface, said transport means being movable relative to said first supporting surface to convey the products over said first supporting surface along a first path in said first direction to said first stop means whereby a row of the products extending from said first stop means may be formed, said first supporting surface being fluid permeable;

a sliding platform, said platform being positioned adjacent to said feed system means first support means and being reciprocally movable beneath said first supporting surface along a second path which is generally transverse to said first path, said sliding platform also being vertically movable relative to said first support means, said sliding platform having a second product supporting surface which is fluid permeable, said sliding platform further including second stop means for arresting movement of the products along said second path in said second direction;

means for pushing the products off said feed system means first supporting surface onto said sliding platform second supporting surface, said pushing means including a push-off element which is movable relative to said first and second supporting surfaces to urge the products into contact with said second stop means; and means for delivering pressurized air to a region immediately below each of said first and second supporting surfaces whereby an air cushion for reducing friction between the products and the supporting surfaces is formed between said supporting surfaces and the products;

the permeability of the material comprising said supporting surfaces being chosen to be such that the pressure drop in an unladen portion thereof is at least equal to the pressure drop in a portion that is laden with the products.

2. The apparatus of claim 1 wherein said transport means comprises a plurality of belts which are spaced from one another, said belts being supported on said first supporting surface and being driven in a manner such that they define a continuous path.

3. The apparatus of claim 2 wherein said first supporting surface is provided with grooves and said belts are positioned in said grooves.

4. The apparatus of claim 1 wherein said transport means comprises at least a first transport belt which is air-permeable, said transport belt being supported on said first supporting surface and being driven in a manner such that it defines a continuous path.

5. The apparatus of claim 1 wherein said sliding platform is provided with a third supporting surface which is comprised of a porous sintered material, the air delivered to the region below said second supporting surface also passing through said third supporting surface and forming an air cushion which acts downwardly against a layer of products that have already been stacked.

6. The apparatus of claim 1 wherein at least said first supporting surface is carried by a structural component which serves as a support element, said support element in part comprising said pressurized air delivering means and cooperating with said first supporting surface to form an air space.

7. The apparatus of claim 5 wherein the third and second supporting surfaces of the sliding platform are held apart by means of an intermediate support to form an air space which is contiguous with said pressurized air delivering means.

8. The apparatus of claim 1 wherein said first and second supporting surfaces respectively are comprised of a highly porous material which is permeable to fluid media, and through which a gaseous medium can be drawn in order to produce a partial vacuum, the permeability of the porous material being chosen to be such that the resistance in an uncovered portion thereof is not less than the resistance in a portion that is covered by the products.

9. The apparatus of claim 2 wherein the sliding platform is provided with a third supporting surface which is comprised of a highly porous sintered material, said third supporting surface being parallel to and spaced from said second supporting surface and facing downwardly toward a layer of products that have already been stacked.

10. The apparatus of claim 3 wherein the sliding platform is provided with a third supporting surface which is comprised of a highly porous sintered material, said third supporting surface being parallel to and spaced from said second supporting surface and facing downwardly toward a layer of products that have already been stacked.

11. The apparatus of claim 4 wherein the sliding platform is provided with a third supporting surface which is comprised of a highly porous sintered material, said third supporting surface being parallel to and spaced from said second supporting surface and facing downwardly toward a layer of products that have already been stacked.

12. The apparatus of claim 2, wherein at least said first supporting surface is carried by a structural component which serves as a support element, said support element in part comprising said pressurized air delivering means and cooperating with said first supporting surface to form an air space.

13. The apparatus of claim 3 wherein at least said first supporting surface is carried by a structural component which serves as a support element, said support element in part comprising said pressurized air delivering means and cooperating with said first supporting surface to form an air space.

14. The apparatus of claim 4 wherein at least said first supporting surface is carried by a structural component which serves as a support element, said support element in part comprising said pressurized air delivering means and cooperating with said first supporting surface to form an air space.

15. The apparatus of claim 5 wherein at least said first supporting surface is carried by a structural component which serves as a support element, said support element in part comprising said pressurized air delivering means and cooperating with said first supporting surface to form an air space.

16. The apparatus of any one of claims 5 or 9 through 11 wherein the third and second supporting surfaces of the sliding platform are held apart by means of an intermediate support to form an air space which is contiguous with said pressurized air delivering means.

17. The apparatus as claimed in any one of claims 2, 3, 4, 5, 6, 7, 9, 10, 11, 12, 13, 14 or 15 wherein the first and second supporting surfaces respectively of the feed system means and the sliding platform are comprised of a highly porous material which is permeable to fluid media through which a gaseous media can be drawn in order to produce a partial vacuum, the permeability of said porous material being chosen to be such that the resistance to fluid flow in an uncovered portion of the supporting surfaces is not less than the resistance to fluid flow in a portion of the supporting surfaces that is covered by the products.

* * * * *